US008954000B2

(12) United States Patent
Rozmaryn et al.

(10) Patent No.: US 8,954,000 B2
(45) Date of Patent: Feb. 10, 2015

(54) REAL-TIME SIGNAL VALIDATION METHOD AND SYSTEM

(71) Applicant: Hughes Network Systems, LLC, Germantown, MD (US)

(72) Inventors: Jack Rozmaryn, Silver Spring, MD (US); Kent Pellerin, Rockville, MD (US)

(73) Assignee: Hughes Network Systems, LLC, Germantown, MD (US)

( * ) Notice: Subject to any disclaimer, the term of this patent is extended or adjusted under 35 U.S.C. 154(b) by 273 days.

(21) Appl. No.: 13/666,706

(22) Filed: Nov. 1, 2012

(65) Prior Publication Data

US 2014/0120830 A1 May 1, 2014

(51) Int. Cl.
 H04B 17/02 (2006.01)
(52) U.S. Cl.
 CPC .................................. *H04B 17/02* (2013.01)
 USPC ............. 455/9; 455/12.1; 455/427; 455/13.1; 455/67.14; 455/67.11
(58) Field of Classification Search
 CPC ........... H04B 17/0007; H04B 17/0042; H04B 17/0045; H04B 17/0062; H04B 17/0047; H04B 17/005; H04B 17/0052; H04B 17/0057; H04B 17/0072; H04B 17/0075; H04B 17/0077; H04B 17/0067; H04B 17/0022
 USPC ............. 455/9, 10, 12.1, 13.1, 13.3, 13.4, 69, 455/522, 67.11, 67.13, 67.16, 115.1, 115.2, 455/115.3, 135, 245.1, 226.3, 226.2, 226.1, 455/428, 67.4, 423, 67.14; 370/316, 311, 370/465
See application file for complete search history.

(56) References Cited

U.S. PATENT DOCUMENTS

| 5,491,791 | A | | 2/1996 | Glowny et al. |
| 5,974,032 | A | * | 10/1999 | Snowden et al. ............. 370/316 |
| 6,078,810 | A | * | 6/2000 | Olds et al. ..................... 455/428 |
| 6,445,916 | B1 | | 9/2002 | Rahman |
| 6,847,817 | B2 | | 1/2005 | Hadinger et al. |
| 8,700,957 | B2 | | 4/2014 | La Fever et al. |
| 2003/0050015 | A1 | * | 3/2003 | Kelly et al. .................. 455/67.4 |
| 2003/0054816 | A1 | | 3/2003 | Krebs et al. |
| 2004/0198237 | A1 | * | 10/2004 | Abutaleb et al. ................ 455/78 |
| 2004/0199573 | A1 | | 10/2004 | Schwartz et al. |
| 2006/0084377 | A1 | | 4/2006 | Lee et al. |
| 2008/0055152 | A1 | | 3/2008 | Hudson et al. |
| 2010/0150017 | A1 | | 6/2010 | Choo |
| 2010/0223491 | A1 | | 9/2010 | Ladd et al. |
| 2011/0143654 | A1 | | 6/2011 | Mukhija |
| 2014/0004789 | A1 | * | 1/2014 | Rozmaryn ........................ 455/9 |
| 2014/0004790 | A1 | * | 1/2014 | Rozmaryn ........................ 455/9 |

* cited by examiner

*Primary Examiner* — Tan Trinh
(74) *Attorney, Agent, or Firm* — K&L Gates LLP (57) ABSTRACT

Systems and methods for real-time signal validation are disclosed. In an example embodiment, a subset of terminals in a peer group of satellite terminals is determined. Operational statistics of the satellite terminals in the subset of terminals is measured. Operational statistics of each of the satellite terminals in the subset of terminals is compared to a prior measurement of the same operational statistics. An offset between a current measurement of the operational statistics and the prior measurement of the same operational statistics is determined. An average offset of the current measurement of the operational statistics and the prior measurement of the same operational statistics is determined for the subset of terminals. The average offset for the subset of terminals is merged with a previously determined peer group operational statistic. A signal validation of a terminal is performed using an updated deviation value.

20 Claims, 7 Drawing Sheets

REAL-TIME SIGNAL VALIDATION METHOD AND SYSTEM

CROSS REFERENCE TO RELATED APPLICATIONS

The present application relates to the following co-pending patent applications: "Peer Group Diagnosis Detection Method and System," filed on Jun. 28, 2012, as U.S. patent application Ser. No. 13/536,604, "Problem Signature Terminal Diagnosis Method and System," filed on Jun. 28, 2012, U.S. patent application Ser. No. 13/536,600, and "Terminal Diagnosis Self Correction Method and System," filed on Jun. 28, 2012, U.S. patent application Ser. No. 13/536,610, the entire contents of each of which are incorporated by reference herein.

BACKGROUND

Wireless communication systems typically include a plurality of user terminals that are used by customers or end users which transmit and receive data from satellites and/or other antennas. For a satellite based communication system, a satellite terminal is typically set up at the user location by a service technician or installer. For example, a user's home may have a satellite dish installed for receiving internet, telephone, and television service, or the like. The satellite dish is installed with associated hardware, such as a transmitter, receiver, modem, router, set-top box, and the like. The service technician configures the terminal for optimal use, for example, by correctly orienting the satellite dish, configuring all settings appropriately, and testing the terminal to ensure it is working properly before leaving the installation.

Typically, when a customer of a satellite communication system has a problem with the service (e.g., service interruption, pixilation, slow internet), the customer calls a customer service hotline and speaks with a customer service representative. The customer service representative may attempt to diagnose the problem and determine if any repair is needed, or determine that the service interruption is caused by weather conditions or a regional service interruption. Statistical measurement data from the satellite terminal may be obtained for analysis to determine if there is a problem. Typically, this measured data may provide some insight that may confirm that a problem exists based on the customer inquiry. However, this data is generally not as useful for detecting that a problem exists before the customer notices the problem and places an inquiry call.

SUMMARY

The present disclosure provides a new and innovative method and system for real-time signal validation. In an example embodiment, a subset of terminals in a peer group of satellite terminals is determined. At least one operational statistic of the satellite terminals in the subset of terminals is measured. At least one operational statistic of each of the satellite terminals in the subset of terminals is compared to a prior measurement of the same at least one operational statistic for each of the satellite terminals in the subset of terminals. An offset between a current measurement of the at least one operational statistic and the prior measurement of the same at least one operational statistic is determined for each of the satellite terminals in the subset of terminals. An average offset of the current measurement of the at least one operational statistic and the prior measurement of the same at least one operational statistic is determined for the subset of terminals. The average offset for the subset of terminals is merged with at least one previously determined peer group operational statistic. A signal validation of a terminal is performed using an updated deviation value.

Additional features and advantages of the disclosed system, methods, and apparatus are described in, and will be apparent from, the following Detailed Description and the Figures.

DETAILED DESCRIPTION OF EXAMPLE EMBODIMENTS

Figure 1:
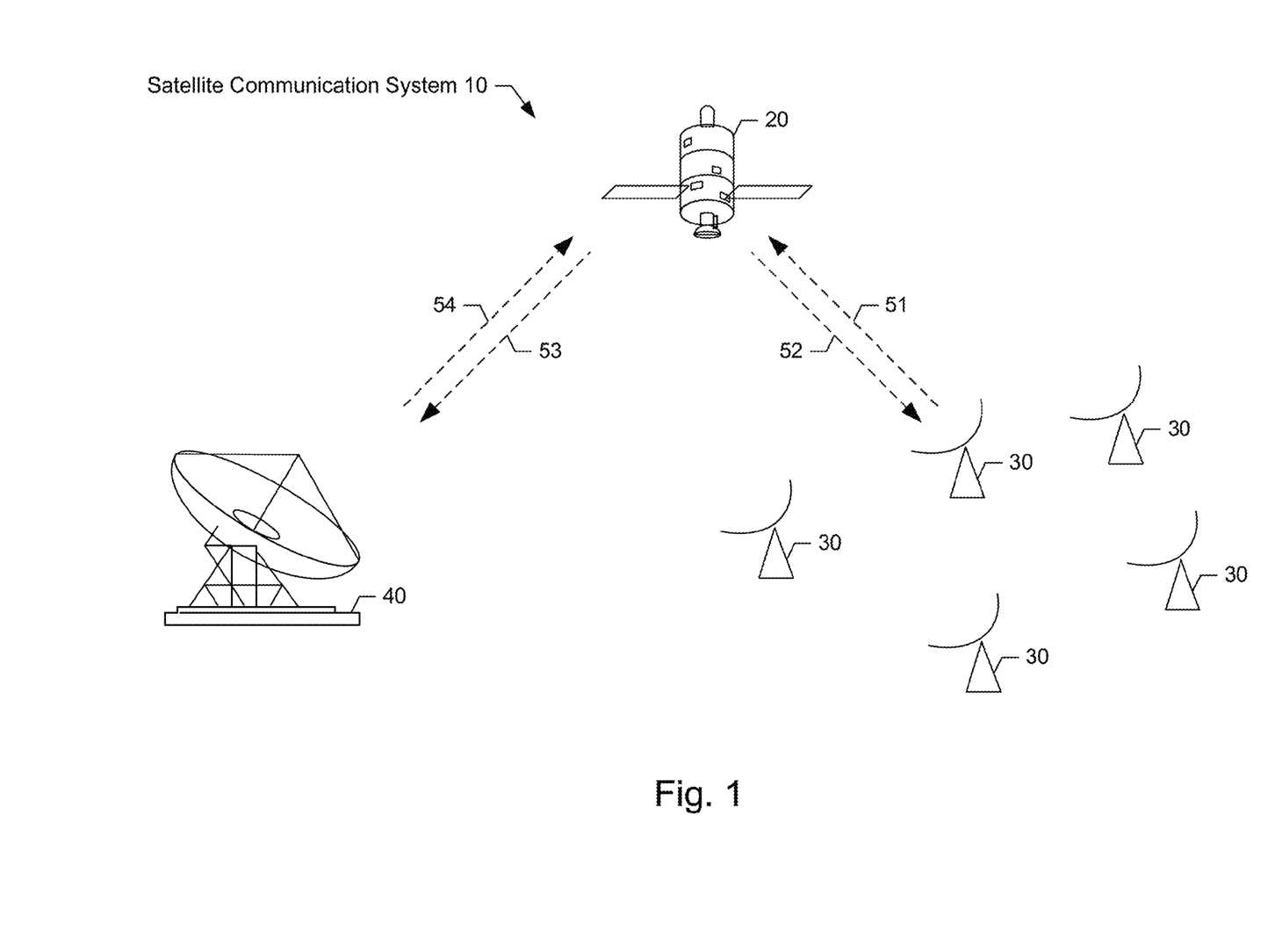
FIG. 1 is a high level block diagram of an example satellite communication system, according to an example embodiment of the present disclosure.

A high level block diagram of an example satellite communication system 10 is illustrated in FIG. 1. The illustrated system 10 includes a satellite 20 and satellite terminals 30, each including an antenna and associated hardware (e.g., receiver, transmitter, modem, router, computing device). The satellite terminals 30 may transmit and receive data to and from the satellite 20. Typically, a satellite 20 receives data from a hub terminal 40 which is distributed to many satellite terminals 30. It should be appreciated that a satellite terminal 30 may communicate with one or more satellites 20. Similarly, a satellite 20 may communicate with one or more hub terminals 40, and a hub terminal 40 may communicate with one or more satellites 20. Typically, a satellite 20 communicates with each satellite terminal 30 using an uplink channel 51 and a downlink channel 52, and also communicates with a satellite hub 40 using a downlink channel 53 and an uplink channel 54. The uplink channel 54 and downlink channel 52 may be referred to as a forward channel while the uplink channel 51 and downlink channel 53 may be referred to as a return channel. It should be appreciated that the uplink channels 51, 54 and downlink channels 52, 53 typically each operate in different frequency bands and with totally independent circuitry. Accordingly, for example, a satellite terminal 30 typically may transmit data on the uplink channel 51 at a first frequency and receive data on the downlink channel 52 at a second frequency. For a satellite terminal 30, the performance of the uplink channel 51 and the downlink channel 52 are typically both separately evaluated in determining a site diagnosis, as uplink data and downlink data each provide insight into any problems which may exist for the satellite terminal 30.

It should be appreciated that in order for a satellite 20 to communicate with a satellite terminal 30, the satellite terminal 30 must be configured correctly with a proper line of sight to the satellite 20. The satellite communication system 10 may be operating in any broadband network, for example, the $K_a$ band, the $K_u$ band, the C band, or the like. For example, satellite communication system 10 may be implemented on the SPACEWAY® and/or JUPITER™ platform. Accordingly, the system 10 may provide satellite coverage over a smaller area or larger area, for example, regional coverage may be dozens or hundreds of miles wide. Also, for example, the system 10 may provide continental coverage.

If the antenna alignment of the satellite terminal 30 is not within a certain tolerance, transmission and/or reception of data may degrade and/or fail. However, even with proper antenna alignment, a satellite terminal 30 may have reception or transmission problems due to environmental issues such as inclement weather conditions. For example, rain fade is a common problem for certain frequency ranges (e.g., the $K_a$ band). Also, other interference sources, such as structures which may block a satellite terminal's 30 line of sight, may impede communication. Further, problems with terminal components and/or settings may cause signal degradation or failure. Components may fail or degrade for a variety of reasons (e.g., physical structural damage, short circuit). In some cases, a particular satellite terminal 30 may be experiencing multiple different problems simultaneously. Moreover, there are many potential causes of suboptimal communication for a satellite terminal 30, and it is often difficult to correctly diagnose the specific problem or problems a satellite terminal 30 may need corrected. Accordingly, for an operator of a satellite communication system 10, it may be highly advantageous to improve the accuracy of terminal diagnosis when a satellite terminal 30 is experiencing a problem with service. Also, it may be advantageous to detect a problem before a customer notices any interruption or decline in service quality.

It should be appreciated that satellite terminals 30, which may also be known as user terminals, earth terminals, ground stations, antenna sites, or the like, may be referred to in the present application simply as terminals or sites. Similarly, the terms customer service representative, customer service agent, and service agent may be used interchangeably in the present disclosure. Likewise, installer, service technician, repair technician, onsite technician, installation technician, and technician may be used interchangeably in the present disclosure. Also, customer, end user, and user may be used interchangeably in the present disclosure. Further, it should be appreciated that, the present application may provide example embodiments relating to a satellite based communication system 10 as illustrated in FIG. 1, however, the present disclosure may be similarly applicable to other wireless communication systems.

Figure 2:
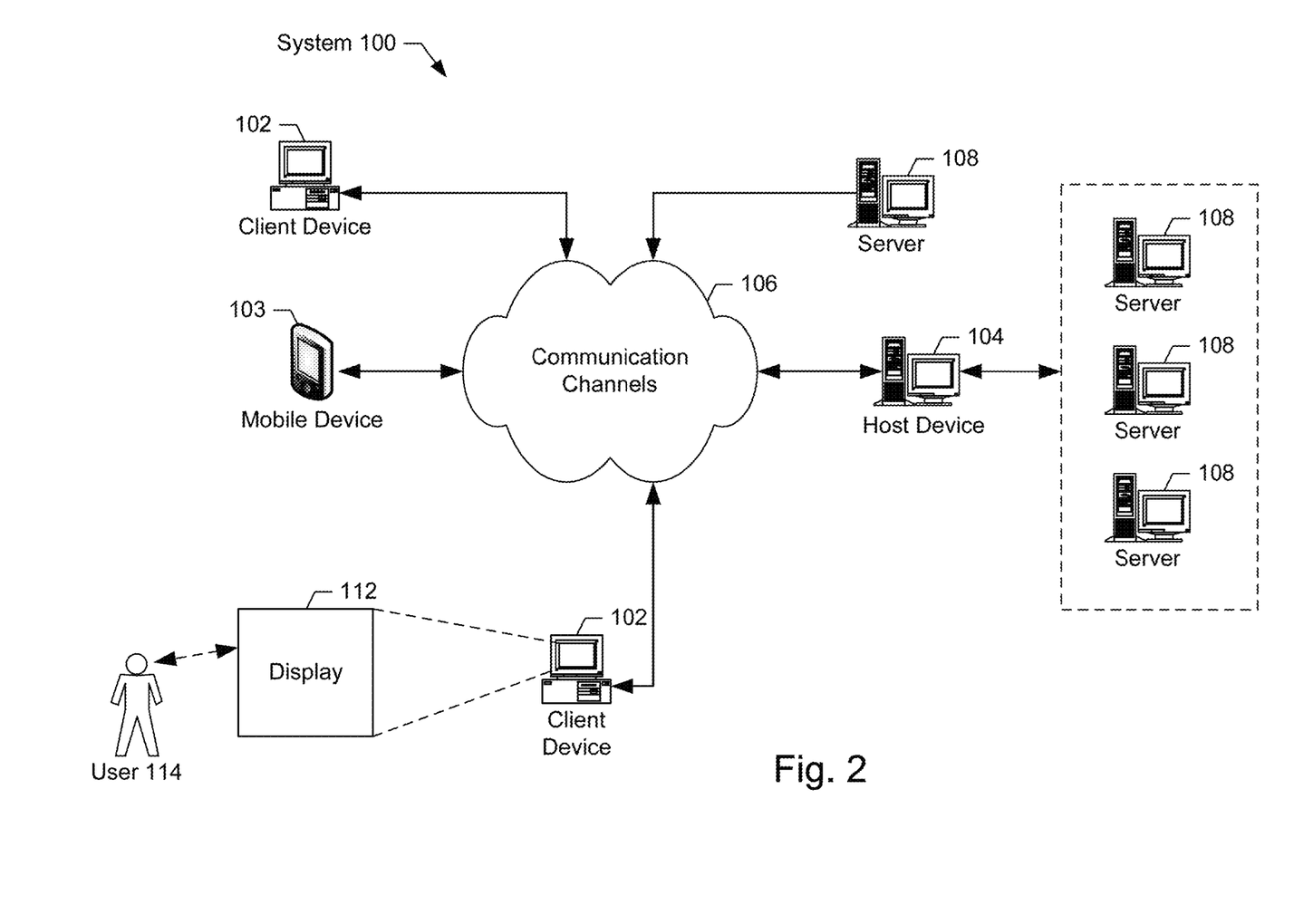
FIG. 2 is a high level block diagram of an example communication system, according to an example embodiment of the present disclosure.

A high level block diagram of an example network communications system 100 is illustrated in FIG. 2. The illustrated system 100 includes one or more client devices 102, one or more host devices 104, and one or more communication channels 106 (e.g., satellite communication). In a satellite communication system 10, the communication channels 106 include communication via the air interface between a hub terminal 40 and a satellite 20, and the satellite 20 and a satellite terminal 30. Also, for example, the hub terminal 40 may communicate with a host device 104 (e.g., content provider) and the satellite terminal 30 may communicate with a client device 102 (e.g., personal computer). Likewise, a hub terminal 40 and/or satellite terminal 30 may communicate with devices and/or networks that are not satellite based systems or not wireless (e.g., a local area network).

The system 100 may include a variety of client devices 102, such as desktop computers, televisions, and the like, which typically include a display 112, which is a user display for providing information to users 114, and various interface elements as will be discussed in further detail below. A client device 102 may be a mobile device 103, which may be a laptop computer, a tablet computer, a cellular phone, a personal digital assistant, etc. The client devices 102 may communicate with the host device 104 via a connection to one or more communications channels 106 such as the Internet or some other data network, including, but not limited to, any suitable wide area network or local area network. It should be appreciated that any of the devices described herein may be directly connected to each other instead of over a network. Typically, one or more servers 108 may be part of the network communications system 100, and may communicate with host servers 104 and client devices 102.

One host device 104 may interact with a large number of users 114 at a plurality of different client devices 102. Accordingly, each host device 104 is typically a high end computer with a large storage capacity, one or more fast microprocessors, and one or more high speed network connections. Conversely, relative to a typical host device 104, each typical client device 102 may often include less storage capacity, a single microprocessor, and a single network connection. It should be appreciated that a user 114 as described herein may include any customer, person, or entity which uses the presently disclosed system and may include a wide variety of parties for both business use and personal use.

Typically, host devices 104 and servers 108 store one or more of a plurality of files, programs, databases, and/or web pages in one or more memories for use by the client devices 102, and/or other host devices 104 or servers 108. A host device 104 or server 108 may be configured according to its particular operating system, applications, memory, hardware, etc., and may provide various options for managing the execution of the programs and applications, as well as various administrative tasks. A host device 104 or server may interact via one or more networks with one or more other host devices 104 or servers 108, which may be operated independently. For example, host devices 104 and servers 108 operated by a separate and distinct entities may interact together according to some agreed upon protocol.

Figure 3:
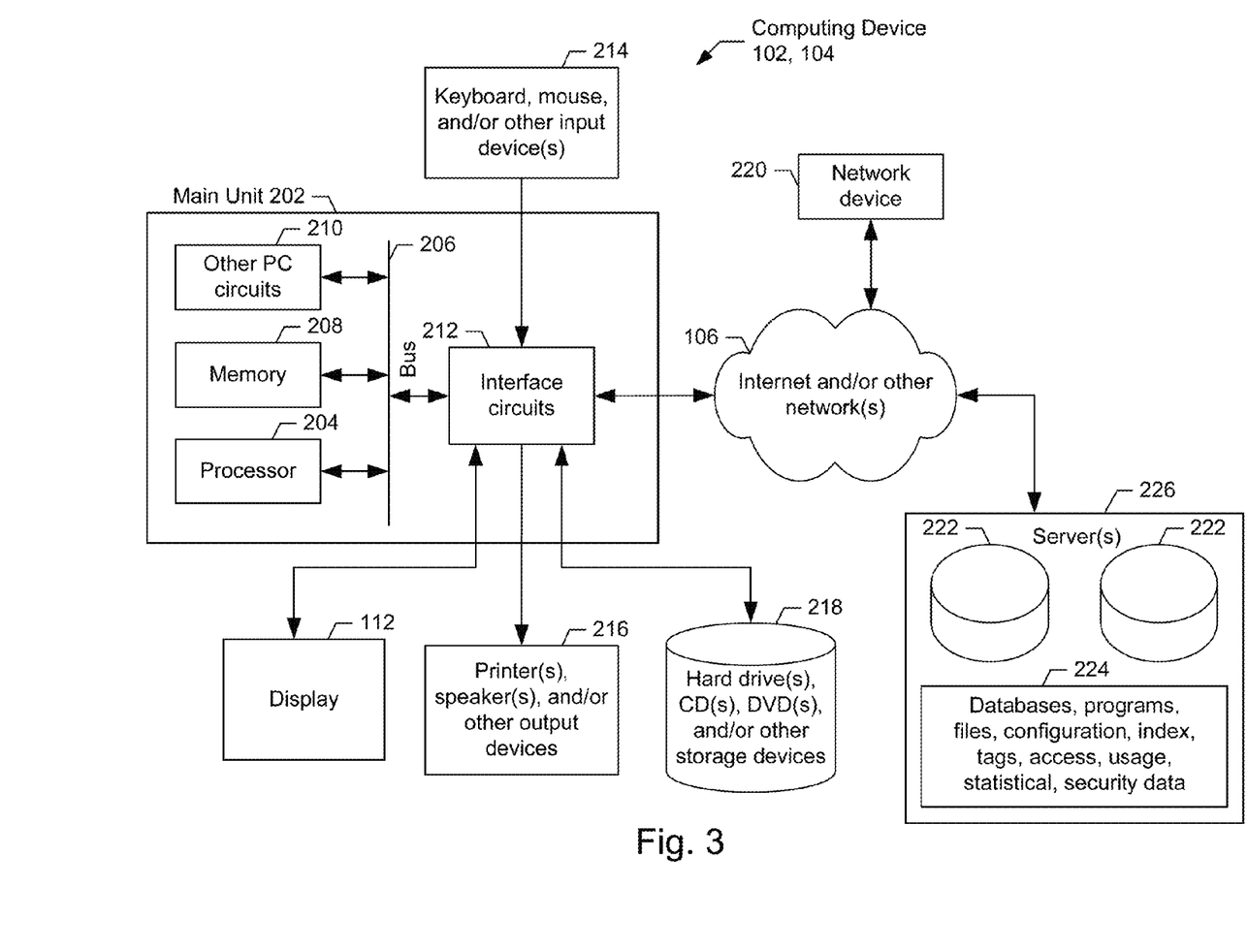
FIG. 3 is a detailed block diagram of an example a computing device, according to an example embodiment of the present disclosure.

A detailed block diagram of the electrical systems of an example computing device (e.g., a client device 102, a host device 104) is illustrated in FIG. 3. In this example, the computing device 102, 104 includes a main unit 202 which preferably includes one or more processors 204 electrically coupled by an address/data bus 206 to one or more memory devices 208, other computer circuitry 210, and one or more interface circuits 212. The processor 204 may be any suitable processor, such as a microprocessor from the INTEL PENTIUM® family of microprocessors. The memory 208 preferably includes volatile memory and non-volatile memory. Preferably, the memory 208 stores a software program that interacts with the other devices in the system 100 as described below. This program may be executed by the processor 204 in any suitable manner. In an example embodiment, memory 208 may be part of a "cloud" such that cloud computing may be utilized by a computing devices 102, 104. The memory 208 may also store digital data indicative of documents, files, programs, web pages, etc. retrieved from a computing device 102, 104 and/or loaded via an input device 214.

The interface circuit 212 may be implemented using any suitable interface standard, such as an Ethernet interface and/ or a Universal Serial Bus (USB) interface. One or more input devices 214 may be connected to the interface circuit 212 for entering data and commands into the main unit 202. For example, the input device 214 may be a keyboard, mouse, touch screen, remote control, track pad, track ball, isopoint, image sensor, character recognition, barcode scanner, microphone, and/or a speech or voice recognition system.

One or more displays 112, printers, speakers, and/or other output devices 216 may also be connected to the main unit 202 via the interface circuit 212. The display 112 may be a cathode ray tube (CRTs), a liquid crystal display (LCD), or any other type of display. The display 112 generates visual displays generated during operation of the computing device 102, 104. For example, the display 112 may provide a user interface that may display one or more web pages received from a computing device 102, 104. A user interface may typically include prompts for human input from a user 114 including links, buttons, tabs, checkboxes, thumbnails, text fields, drop down boxes, etc., and may provide various outputs in response to the user inputs, such as text, still images, videos, audio, and animations.

One or more storage devices 218 may also be connected to the main unit 202 via the interface circuit 212. For example, a hard drive, CD drive, DVD drive, and/or other storage devices may be connected to the main unit 202. The storage devices 218 may store any type of data, such as image data, video data, audio data, tag data, historical access or usage data, statistical data, security data, etc., which may be used by the computing device 102, 104.

The computing device 102, 104 may also exchange data with other network devices 220 via a connection to communication channel 106. Network devices 220 may include one or more servers 226, which may be used to store certain types of data, and particularly large volumes of data which may be stored in one or more data repository 222. A server 226 may include any kind of data 224 including databases, programs, files, libraries, configuration data, index or tag data, historical access or usage data, statistical data, security data, etc. A server 226 may store and operate various applications relating to receiving, transmitting, processing, and storing the large volumes of data. It should be appreciated that various configurations of one or more servers 226 may be used to support and maintain the system 100. For example, servers 226 may be operated by various different entities. Also, certain data may be stored in a client device 102 which is also stored on the server 226, either temporarily or permanently, for example in memory 208 or storage device 218. The network connection may be any type of network connection, for example, wireless connection, satellite connection, Bluetooth connection, Ethernet connection, digital subscriber line (DSL), telephone line, coaxial cable, etc.

Figure 4:
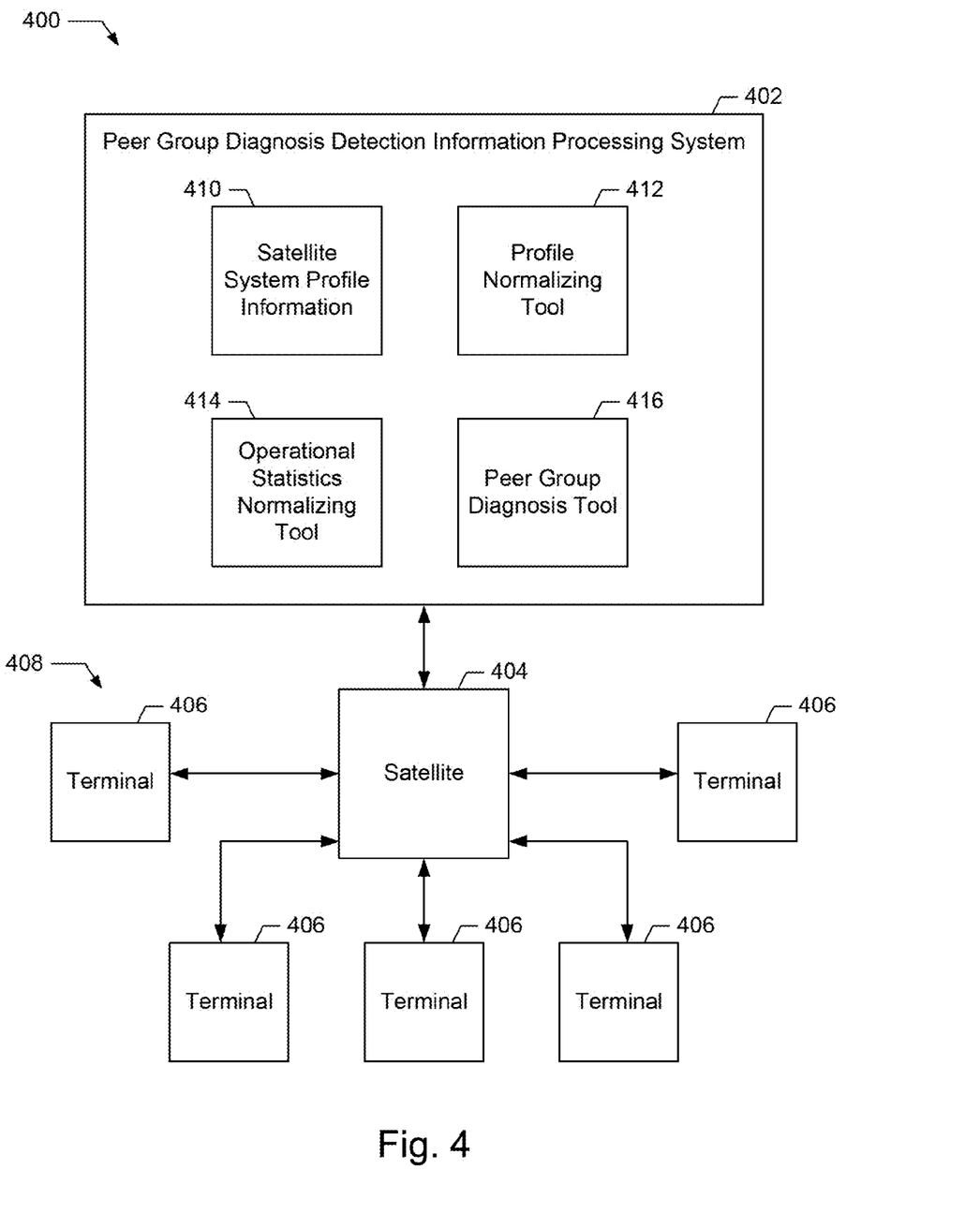
FIG. 4 is a block diagram of an example peer group diagnosis detection system, according to an example embodiment of the present disclosure.

FIG. 4 is a block diagram of an example peer group diagnosis detection system 400. The peer group diagnosis detection system 400 may include a peer group diagnostic information processing system 402, a satellite 406, a plurality of terminals 406, and a peer group 408. The terminal diagnostic information processing system 402 include satellite system profile information 410, a profile normalizing tool 412, an operational statistics normalizing tool 414, and a peer group diagnosis tool 416. It should be appreciated that the respective diagram blocks of FIG. 4 may represent one or more physical devices for ease of understanding.

A peer group diagnosis detection information processing system 402 may be used, for example, by a company that provides satellite services, such as television, internet, telephone, etc., to customers, including home use customers, commercial businesses, and the like. The peer group diagnosis detection information processing system 402 is used to detect problem terminals 406 by diagnosing terminals 406 within a peer group 408, for example, as good, degraded, or bad. The peer group diagnosis detection information processing system 402 may be implemented at a diagnostic center. The satellite 404 may communicate with the peer group diagnosis detection information processing system 402 to provide data from terminals 406 in the peer group 408. The satellite 404 may communicate with the peer group diagnosis detection information processing system 402 and terminals 406, for example, as discussed above. It should be appreciated that many terminals 406 (e.g., hundreds or thousands) may be part of a peer group 408, and likewise, many satellites 406 and/or peer groups 408 may be included in a peer group diagnosis detection system 400.

The peer group diagnosis detection information processing system 402 may include a database, files, or the like with satellite system profile information 410. The satellite system profile information typically includes satellite beam profiles, satellite terminal profiles, and various other information regarding satellites 404 and terminals 406. The satellite system profile information may be used to determine peer groups 408. A profile normalizing tool 412 may be used to normalize a baseline profile for a peer group 408. An operational statistics normalizing tool 414 may be used to normalize operational statistics (e.g., signal to noise ratio, symbol rate) which may be measured at terminals 406 of the peer group 408. A peer group diagnosis tool 416 is used to diagnose terminals 406 of the peer group 408 based on the normalized operational statistics.

Figure 5:
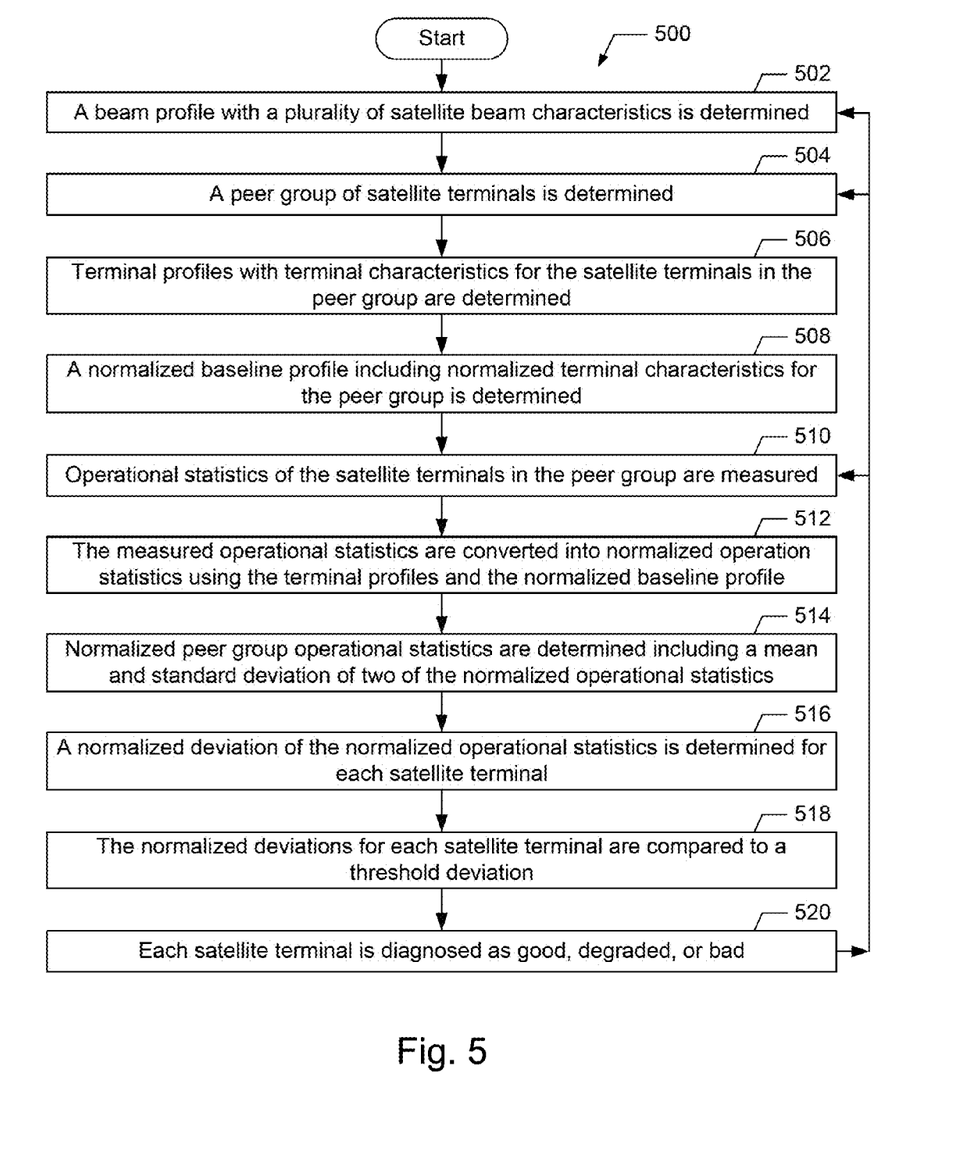
FIG. 5 includes a flowchart illustrating an example process for peer group diagnosis detection, according to an example embodiment of the present disclosure.

FIG. 5 includes a flowchart of an example process 500 for peer group diagnosis detection. Although the process 500 is described with reference to the flowchart illustrated in FIG. 5, it will be appreciated that many other methods of performing the acts associated with the process 500 may be used. For example, the order of many of the blocks may be changed, many blocks may be intermittently repeated or continually performed, certain blocks may be combined with other blocks, and many of the blocks described are optional or may only be contingently performed.

The example process 500 may begin when a beam profile with a plurality of satellite beam characteristics is determined (block 502). For example, a beam profile for a satellite beam may include characteristics such as carrier frequency, beam transmission power (e.g., Effective Isotropic Radiated Power or EIRP), the geolocation information on the beam including the center point or common point, the size and attenuation pattern of the beam, antenna gain, signal to noise ratio, modulation type, bit rate, tolerances, etc. It should be appreciated that a satellite beam is not uniform as measured from the ground, and that a common point generally located at the center of the beam may have the maximum downlink gain and maximum uplink sensitivity. In an example embodiment, satellite beam may be part of a communication system operating in any broadband network, for example, using the $K_a$ band on the SPACEWAY® platform.

A peer group of satellite terminals is determined (block 504). For example, a peer group may include all the terminals using a particular beam and transponder. Also, for example, if a beam has a large coverage area, a peer group may include all of the terminals located within a block defined by a certain upper and lower latitude and longitude. It should be appreciated that a peer group may be determined based on a variety of other factors, for example, geological structures, weather patterns, other boundaries, or the like. A peer group may typically include hundreds or thousands of terminals.

Terminal profiles with terminal characteristics for the satellite terminals in the peer group are determined (block 506). For example, for each terminal, the terminal characteristics may include all relevant hardware specifications and the geolocation coordinates (e.g., latitude and longitude) and/or the location from the beam center (e.g., in radial ground distance or radial angle from the beam center). Hardware specifications may include antenna type and size, a transmission power, an antenna gain, a signal to noise ratio, a symbol rate, and any other specifications relevant to the configuration of a terminal.

A normalized baseline profile including normalized terminal characteristics for the peer group is determined (block 508). For example, a normalized baseline profile may be determined as a specific hardware configuration at a specific location, such as at the beam center. For example, the hardware configuration may be a 1 watt transmitter, a 0.74 meter dish, a symbol rate of 256, etc. It should be appreciated that the normalized baseline profile may typically represent a common hardware configuration at the beam center. In an example embodiment, at the center of the beam, a terminal may have an expected uplink signal to noise ratio (Es/No) of approximately 15 dB and an expected downlink Es/No of approximately 22 dB. These expected Es/No values may represent an optimally configured terminal in optimal conditions. However, terminals located away from the beam center may have attenuated Es/No values under optimal conditions even when optimally configured. For example, an installing technician may set up a terminal with all the proper equipment, proper align the antenna, etc., and if the terminal is near the edge of the satellite beam, the expected Es/No values may be lower, and thus, more susceptible to service interruptions from weather conditions or the like. Because the optimal operational values (e.g., downlink Es/No) are different for terminals with different hardware configurations and/or locations, a comparison of operational statistics between the different terminals is often of limited value.

Operational statistics of the satellite terminals in the peer group are measured and received (block 510). For example, any or all uplink and downlink statistics may be measured at the terminal, including any raw RF statistics or such as Es/No, G/T, transmission power, reception power or other data statistics such as symbol rate, CRC error rates, latency values, packet loss ratio, throughput speeds, or response times. The operational statistics may be continuously measured or intermittently measured, for example, on a daily or hourly basis, or any other time interval. The measured operational statistics may then be transmitted on a regular basis to a remote location for peer group diagnosis detection, for example, hourly, daily, weekly, or on a continuous basis.

The measured operational statistics are converted into normalized operation statistics using the terminal profiles and the normalized baseline profile (block 512). For example, each of the measured operational statistics is adjusted to normalize each terminal to the normalized baseline profile expected or measured operational statistics. In an example embodiment, converting the measured uplink and downlink signal to noise ratios includes adjusting the measured values by adding an uplink normalization value and a downlink normalization value specific to each satellite terminal based on an antenna size, a transmission power, an antenna gain, and a distance from a satellite beam center point. Accordingly, once the measured operational statistics are converted into normalized operation statistics, the data represents a group of peer terminals that have the same equipment configuration and same location. For example, if a transmitting power of a terminal is less than the transmitting power of the transmitting power of the normalized baseline profile, a value to account for this difference may be added to the uplink Es/No. Similarly, if a terminal is 50 miles from the center the satellite beam, a value accounting for this difference may be added to the uplink and downlink Es/No. Thus, all the terminals normalized operation statistics should generally be the same, except for variations due to varying cable lengths, equipment variations, measurement errors, and other various interference, which would typically be relatively minor. Thus, when a terminal's normalized operation statistics deviate beyond the ordinary variation levels, a problem is indicated.

Normalized peer group operational statistics are determined including a mean and standard deviation of at least two of the normalized operational statistics (block 514). For example, the normalized peer group operational statistics may have an uplink mean Es/No of 12 dB, a downlink mean of Es/No of 17.5 dB, with an uplink Es/No standard deviation of 2, and a downlink Es/No standard deviation of 2.5. In an example embodiment, a site count associated with the peer group is included with the normalized peer group operational statistics. It should be appreciated that the normalized peer group operational statistics may vary based on the particular communication system, the satellite and terminals, the frequency band, the antenna types, and various other variables. It should be appreciated that determining peer group operational statistics from the terminal normalized operational statistics may include outlier removal, or other manipulation for statistical purposes. For example, any uplink or downlink signal to noise ratio that has a deviation greater than 1.3 standard deviations from the peer group mean may be removed from the data set to obtain a revised mean and standard deviation of the remaining terminals. Accordingly, any outliers may be removed to ensure that the normalized peer group operational statistics are representative of a normally functioning terminal. Also, other operational statistics besides the uplink and downlink signal to noise ratio may be normalized for the peer group in a similar fashion. For example, symbol rate, latency values, error rates, throughput speeds, signal strength, or any signal or performance quality metric, may advantageously be used as normalized peer group operational statistics, alone, or in conjunction with other statistics.

A normalized deviation of at least two operational statistics is determined for each satellite terminal (block 516). For example, using the normalized peer group operational statistics, a normalized uplink Es/No deviation and a normalized downlink Es/No deviation may be determined for each terminal in the peer group. For example, the normalized uplink and downlink Es/No deviations of a given terminal may be UL $-0.6\ \sigma$ and DL $-0.8\ \sigma$. It should be appreciated that the normalized deviation may be expressed in units other than standard deviations ($\sigma$), for example, in decibels (dB). In this example embodiment, the normalized deviations may be expressed, for example, as UL $-1.2$ dB and DL $-2.0$ dB instead of UL $-0.6\ \sigma$ and DL $-0.8\ \sigma$. Other typical examples of normalized deviations for terminals in the example peer group may be as follows: UL $-1.5\ \sigma$ and DL $-0.2\ \sigma$; UL $-2.1\ \sigma$ and DL $+0.4\ \sigma$; UL $+1.2\ \sigma$ and DL $-0.5\ \sigma$; UL $+0.3\ \sigma$ and DL $+1.1\ \sigma$.

The normalized deviations for each satellite terminal are compared to a threshold deviation (block 518). In an example embodiment, each normalized uplink and downlink deviation may be compared to a threshold of $-2.5\ \sigma$. In an example embodiment, each normalized uplink and downlink deviation may be compared to a threshold of $-4.0\ \sigma$. It should be appreciated that a value of a threshold deviation may depend largely on the communication system. Also, multiple threshold deviations may used for comparison for each normalized deviation of each terminal, or each normalized deviation may only be compared to a single threshold deviation.

Figure 6:
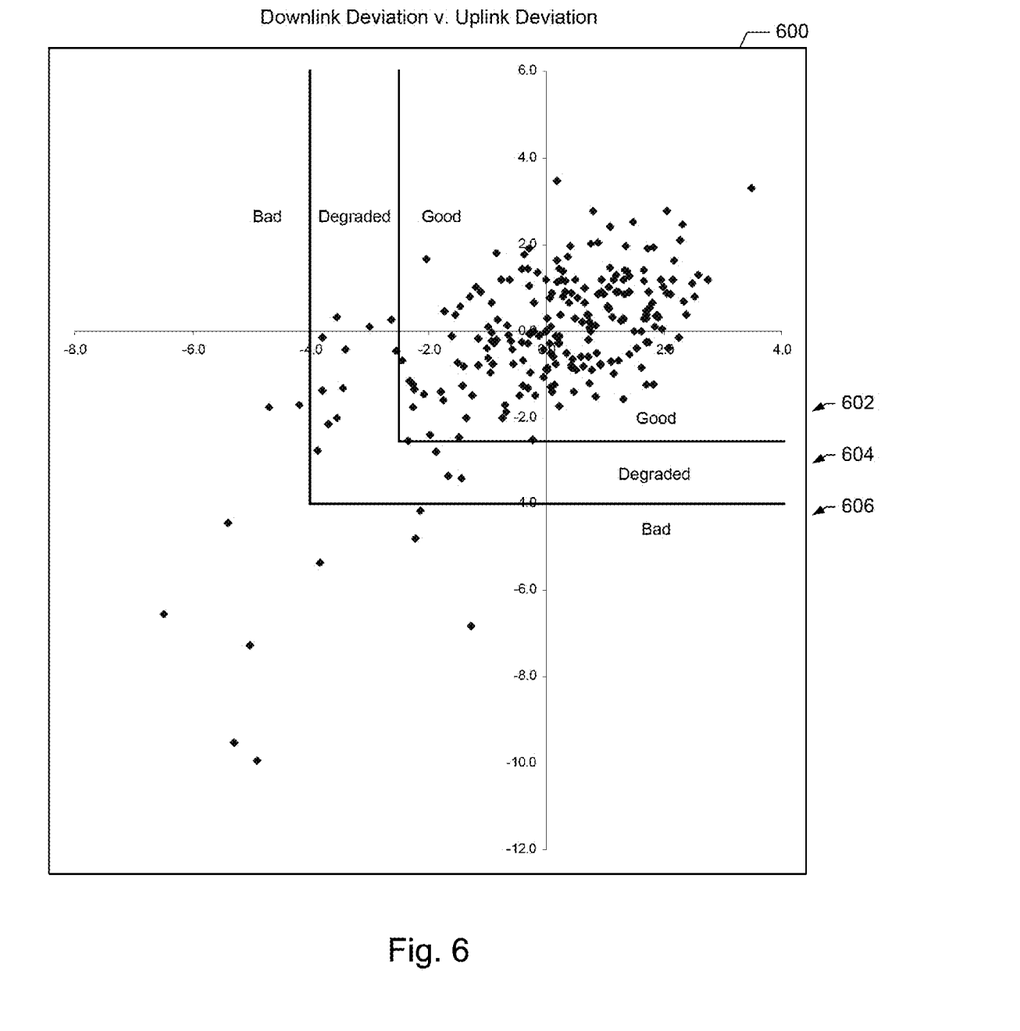
FIG. 6 includes a scatter diagram illustrating an example data set for peer group diagnosis detection, according to an example embodiment of the present disclosure.

Each satellite terminal is diagnosed as good, degraded, or bad (block 520). For example, when a terminal's normalized uplink and downlink deviations are above the threshold of $-2.5\ \sigma$, the terminal may be diagnosed as good or OK. When either of a terminal's normalized uplink and downlink deviations is below the threshold of $-4.0\ \sigma$, the terminal may be diagnosed as bad, and likely in need of service. When either of a terminal's normalized uplink and downlink deviations is below the threshold of $-2.5\ \sigma$, and both of a terminal's normalized uplink and downlink deviations are above the threshold of $-4.0\ \sigma$, the terminal is diagnosed as degraded. As discussed below, FIG. 6 illustrates an example scatter diagram illustrating such an exemplary diagnosis of terminals. It should be appreciated that the thresholds may be used to differentiate varying degrees of problem severity, such as by differentiating between merely degraded terminals and bad terminals. Typically, for example, a bad terminal may provide significant service interruptions while a degraded terminal may provide limited service interruptions which may not even be noticeable to the customer or a reduction in internet throughput speed and response times for both the uplink and downlink. However, the threshold(s) may be adjusted for each communication system to provide a diagnosis as needed. For example, if a terminal is merely degraded, no action may be required, however, if the customer calls to complain about poor service, there is already data confirming that the service is not optimal and may be improved with a service call to optimize the terminal. Also, for example, if a terminal is bad, the service provider may contact the customer and schedule an appointment to repair and optimize the terminal, which may improve customer relations. In an example embodiment, newly installed terminals may have their performance validated to ensure that installation technicians are properly installing terminals.

FIG. 6 includes a scatter diagram 600 illustrating an example data set of terminal deviations for peer group diagnosis detection. The scatter diagram 600 plots the normalized deviations for the satellite terminals of a peer group, with the x-axis representing the normalized uplink deviation and the y-axis representing the normalized downlink deviation, such that each data point illustrates the normalized uplink and downlink deviations for a satellite terminal. As discussed above, the threshold deviations may be used to diagnose the terminals in the peer group as good, degraded, or bad. FIG. 6 illustrates diagnosis zones 602, 604, 606, which are presented on the two dimensional scatter diagram for ease of understanding. The deviation thresholds of $-2.5\ \sigma$ and $-4.0\ \sigma$ separate the good zone 602, the degraded zone 604, and the bad zone 606. Accordingly, terminals which have normalized deviations falling in the good zone 602 are diagnosed as good, terminals which have normalized deviations falling in the degraded zone 604 are diagnosed as degraded, and terminals which have normalized deviations falling in the bad zone 602 are diagnosed as bad. It should be appreciated that using a scatter diagram is not necessary to make a diagnosis, but FIG. 6 is informative in that it illustrates that the normalized deviations for the terminals in the peer group may be advantageously compared regardless of hardware configuration and location differences. Also, for example, using the normalized deviations provides for improved performance when a rain fade occurs within the peer group. Generally, the entire peer group will experience a signal degradation, so a properly working terminal will not show any degradation relative to the peer group because the peer group is being subjected to rain fade collectively, so there will typically not be any change in the normalized deviation.

Figure 7:
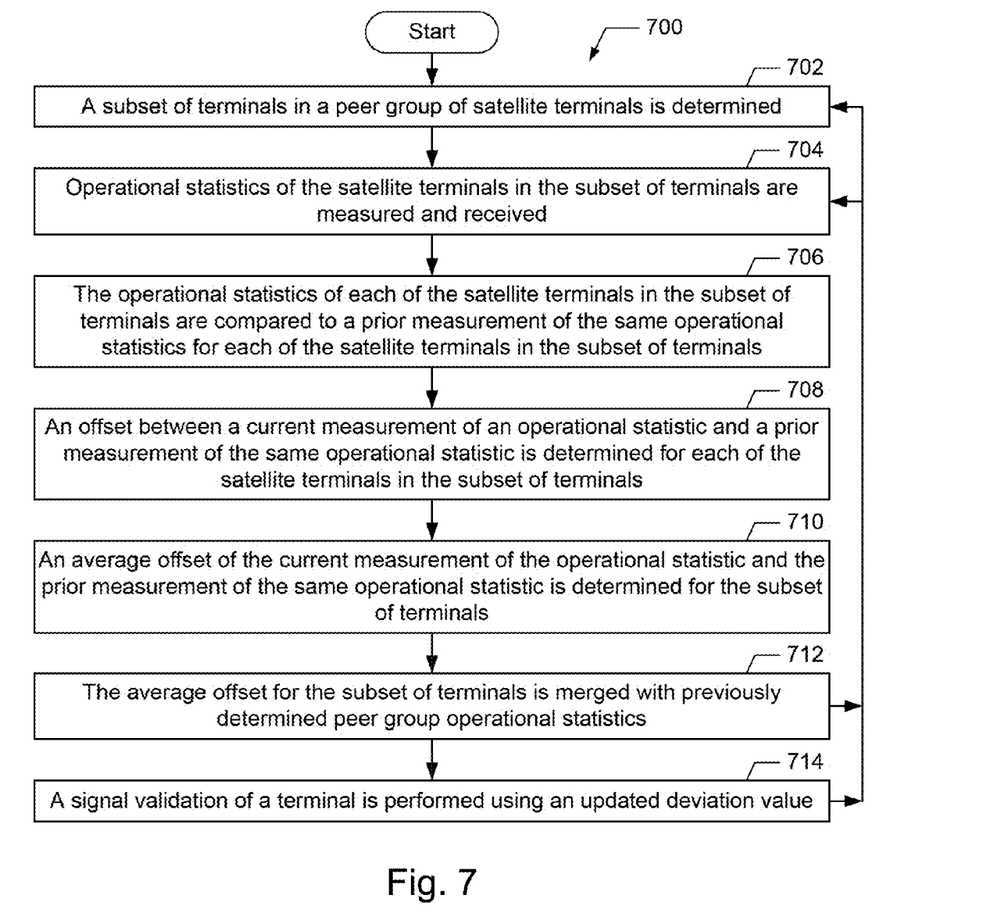
FIG. 7 includes a flowchart illustrating an example process for real-time signal validation, according to an example embodiment of the present disclosure.

FIG. 7 includes a flowchart of an example process 700 for real-time signal validation. Although the process 700 is described with reference to the flowchart illustrated in FIG. 7, it will be appreciated that many other methods of performing the acts associated with the process 700 may be used. For example, the order of many of the blocks may be changed, many blocks may be intermittently repeated or continually performed, certain blocks may be combined with other blocks, and many of the blocks described are optional or may only be contingently performed.

The example process 700 may begin when a subset of terminals in a peer group of satellite terminals is determined (block 702). For example, the example process 500 for peer group diagnosis detection, which is described above, is performed for a peer group of satellite terminals, and from that peer group, a random group of 10% of the total number of terminals is selected. It should be appreciated that the size of a peer group may affect the appropriate size of the subset of terminals. For example, a larger peer group may allow a smaller percentage subset of terminals from the peer group to provide statistically meaningful results, and vice versa. A peer group may typically include 100 to 300 terminals that have a common channel and frequency band in a ¼° latitude by ¼° longitude area, and up to approximately 25 terminals in such a peer group may typically be required to provide a statistically significant sample size for measurement. It should be appreciated that the number of terminals needed to provide a statistically significant sampling of measurements representative of the peer group will vary based on many factors, including the number of terminals in the peer group, the geographic area of the peer group, the consistency or variability of the measurements taken, etc. Accordingly, a subset of terminals will most typically be 10% to 20% of the total peer group, but may be a larger or smaller percentage, and the subset of terminals may be 5 terminals, 25 terminals, 200 terminals, or 1,000 terminals, depending on the specific peer group.

Operational statistics of the satellite terminals in the subset of terminals are measured and received (block 704). For example, any or all uplink and downlink statistics may be measured at each of the terminals in the randomly selected group within the peer group. In an example embodiment, the uplink and downlink statistics may include any raw RF statistics such as Es/No, G/T, transmission power, reception power or other data statistics such as symbol rate, CRC error rates, latency values, packet loss ratio, throughput speeds, or response times. In an example embodiment, more than one measurement may be taken from each terminal to reduce measurement errors associated with each terminal. For example, four sets of measurements may be taken for each terminal in relatively quick succession, such as every two seconds, and these measurement results may be averaged. It should be appreciated that the measurements may be taken more quickly or more slowly (e.g., 1 or 5 seconds), and with a greater or lesser number of measurements (e.g., 2 or 8 measurements). Also, for example, any terminal with erratic variations in these measurements may be disregarded to help ensure that the operational statistics for the subset of terminals are representative of a normally functioning terminal. In an example embodiment, the measurements for each terminal may be taken over a longer period of time to reduce any short term interference, for example, every one or two minutes.

The operational statistics of each of the satellite terminals in the subset of terminals are compared to a prior measurement of the same operational statistics for the subset of terminals (block 706). For example, an uplink Es/No and a downlink Es/No for each terminal in the subset of terminals is compared to the uplink Es/No and the downlink Es/No from the previous day, which can serve as a baseline measurement. For example, for a first terminal in the subset of terminals, measurements taken on Monday may include a measured uplink Es/No of 12 dB and a measured downlink Es/No of 18 dB, while on Tuesday, the first terminal measurements include a measured uplink Es/No of 10.5 dB and a measured downlink Es/No of 16 dB. For a second terminal in the subset of terminals, measurements taken on Monday and Tuesday may include uplink Es/No measurements of 10 dB and 7.5 dB, and downlink Es/No measurements of 17 dB to 13 dB, respectively.

An offset between a current measurement of an operational statistic and a prior measurement of the same operational statistic is determined for each of the satellite terminals in the subset of terminals (block 708). For example, in the above example with measurements from Monday to Tuesday, the first terminal has a decrease in the measured uplink Es/No of 1.5 dB, and a decrease in the measured downlink Es/No of 2 dB, while the second terminal has a decrease in the measured uplink Es/No of 2.5 dB, and a decrease in the measured downlink Es/No of 4 dB. In other words, each determined offset provides a differential between two different measurements of the same operational statistic, for the same terminal, at different points in time. It should be appreciated that an offset may be a positive value (i.e., an increase over time) or a negative value (i.e., a decrease over time).

An average offset of the current measurement of the operational statistic and the prior measurement of the same operational statistic is determined for the subset of terminals (block 710). For example, the first and second exemplary terminals have decreases in measured uplink Es/No of 1.5 dB and 2.5 dB, which averages to an offset of −2 dB, and decreases in measured downlink Es/No of 2 dB and 4 dB, which averages to an offset of −3 dB. It should be appreciated that only two exemplary terminals from the subset of terminals are provided with exemplary changes in measured operational statistics, although typically, a subset of terminals includes up to approximately 25 terminals, and the measurements of these terminals are used for determining an average offset for the subset of terminals by determining a mean value. Further, in an example embodiment, the offsets of the subset of terminals may be subject to outlier removal or other manipulation for statistical purposes. For example, for a given operational statistic, any offset that has a deviation greater than 1.3 standard deviations from the mean offset of the subset of terminals may be removed from the data set to obtain a revised offset of the remaining terminals in the subset of terminals. Accordingly, any outliers may be removed to ensure that the average offset for the subset of terminals is representative of a normally functioning terminal.

The average offset for the subset of terminals is merged with previously determined peer group operational statistics (block 712). For example, as explained above with regard to block 514, previously determined normalized peer group operational statistics may include an uplink mean Es/No of 12 dB, a downlink mean Es/No of 17.5 dB, which are merged with the average offsets of −2 dB uplink Es/No and −3 dB downlink Es/No, providing for updated deviations values. In an example embodiment, a table stores the currently determined average offsets for uplink Es/No and downlink Es/No, a previously determined uplink Es/No mean and downlink Es/No mean for the peer group, and a previously determined uplink Es/No standard deviation value and downlink Es/No standard deviation value for the peer group. In an example embodiment, the average offsets may be merged with the previously determined normalized peer group operational statistics by adding the average offsets to, for example, the previously determined uplink mean Es/No of 12 dB and downlink mean Es/No of 17.5 dB to provide an updated uplink mean Es/No of 10 dB and an updated downlink mean Es/No of 14.5 dB. In an example embodiment, as explained above with regard to block 514, previously determined normalized peer group operational statistics may include an uplink Es/No standard deviation of 2 dB, and a downlink Es/No standard deviation of 2.5 dB. As explained with regard to block 518, a threshold deviation of −2.5 σ for both uplink Es/No and downlink Es/No, is used for comparison to measured statistics of terminals in the peer group. For example, the threshold deviation for uplink Es/No of −2.5 σ can be offset by the average offset of −2 dB, or −1 σ for a standard deviation of −2 dB, to an updated threshold deviation for uplink Es/No of −3.5 σ. Likewise, the threshold deviation for downlink Es/No of −2.5 σ can be offset by the average offset of −3 dB, or −1.2 σ for a standard deviation of −2.5 dB, to an updated threshold deviation for downlink Es/No of −3.7 σ. It should be appreciated that threshold deviations may be expressed in a variety of ways, including standard deviations (σ) or decibels (dB). For example, updated threshold deviations may be expressed in decibels, such as an uplink Es/No of 5 dB and a downlink Es/No of 8.25 dB. These exemplary average offsets based on the measurements of operational statistics from the subset of terminals may indicate that the signal quality for the peer group has deteriorated, for example, due to weather conditions such as rain.

It should be appreciated that additional and/or different operational statistics that those described by way of example above may be used, for example, a reception power, a transmission power, an error rate, and a latency value. In an example embodiment, updated deviation values may be provided in a table which is regularly updated (e.g., a database table), and may be presented as average offset values, updated means, updated standard deviations, or the like. It should also be appreciated that the previously determined normalized peer group operational statistics and/or the average offsets may be manipulated in a variety of ways to provide updated deviation values for comparison and/or manipulation of current measurements of operational statistics for terminals in the peer group. In an example embodiment, previously determined peer group operational statistics that are merged with an average offset may have been previously merged with an average offset at a previous time, providing for operational statistics that may be incrementally updated with average offsets over time.

A signal validation of a terminal is performed using an updated deviation value (block 714). For example, a newly installed terminal provides measurement data of 6 dB uplink Es/No and 9 dB downlink Es/No, which may normally not be considered a good installation, but a rainstorm is currently occurring. The previously determined uplink Es/No mean of 12 dB and downlink Es/No mean of 17.5 dB, and the currently determined average offsets of −2 dB uplink Es/No and −3 dB downlink Es/No, are both subtracted from the current measurements of 6 dB uplink Es/No and 9 dB downlink Es/No, resulting in values of −4 dB and −5.5 dB, respectively. These values may be converted into standard deviations by dividing by the uplink Es/No standard deviation of 2 dB, and the downlink Es/No standard deviation of 2.5 dB, discussed above in block 712, resulting in updated uplink and downlink deviation values for the newly installed terminal of −2 σ and −2.2 σ. Upon comparison to the respective threshold deviations of −2.5 σ and −2.5 σ, the newly installed terminal is validated using the updated deviation values because −2 σ and −2.2 σ are above the threshold deviations of −2.5 σ and −2.5 σ. In another example embodiment, updated deviation values in the form of updated threshold deviations provide a validation of a newly installed terminal with a measured uplink Es/No of 5.2 dB and a measured downlink Es/No of 8.4 dB (e.g., diagnosed as good), even though these measured values might typically indicate that there is a problem with the newly installed terminal (e.g., diagnosed as degraded). The average offsets of −2 dB and −3 dB, which have been determined using current data from the subset of terminals, provides for the use of updated threshold deviations that take into account a rainstorm that is currently deteriorating the uplink and downlink signal quality of the terminals in the peer group. Moreover, for example, the terminal with a measured uplink Es/No of 5.2 dB and a measured downlink Es/No of 8.4 dB should have approximately a uplink Es/No of 7.2 dB and a measured downlink Es/No of 11.4 dB if the current rainstorm were not impacting the signal quality for that terminal, and accordingly, provide a level of signal quality that is acceptable for a terminal performance validation at the time of installation. However, if the average offsets determined using current data from the subset of terminals were not merged with the previously determined peer group operational statistics, the terminal installation could not be validated due the rainstorm affecting the signal quality at the time of installation. It should be appreciated that the measured operational statistics of each terminal may be normalized, for example, as explained above with regard to block 512, prior to any comparison to the updated threshold deviations. Also, in an example embodiment, the measured operational statistics may be stored in a format which generally requires a minimal amount of computational processing for performing relevant statistical comparisons.

Signal validation, or terminal performance validation, may occur upon request or at regularly scheduled intervals. Also, determining and merging average offsets with peer group operational statistics may occur at regularly scheduled intervals or upon request. For example, upon installing a new terminal, a real-time signal validation may occur using measured operational statistics, which are obtained following receiving a request, or which have been recently obtained (e.g., within the last hour). In an example embodiment, a customer complaint may trigger a request for a real-time signal validation of the relevant terminal. In an example embodiment, the example process 700 may occur with increased frequency to provide more frequently updated deviation values upon receiving an indication of severe weather in a specific weather impacted cell of terminals of a peer group. It should be appreciated that an average offset may be determined and merged with previously determined peer group operational statistics to provide for updated deviation values, but that no signal validation of any specific terminal must be performed using the updated peer group operational statistics, for example, if no terminal installations are performed and/or no customer complaints are received before a new subset of terminals provides a new average offset. In an example embodiment, new average offsets are determined at least once every hour (e.g., every 30 minutes), and the resulting updated deviation values are stored in a table for reference. The frequency of determining an average offset may depend on a variety of factors, such as the geographic size of a peer group. For example, the geographic size relates to the amount of time it takes a weather front to move into the area of the peer group, so a half hour or one hour sampling frequency may be appropriate if bad weather is a primary source of interference. If a source of interference has a quicker variability, then the sampling frequency would typically need to be higher (e.g., every 15 minutes), whereas a system having a slowly changing source of interference may have a lower sampling frequency for determining average offsets (e.g., every 6 hours). In an example embodiment, a primary source of interference may be network traffic at peak usage times. In an example embodiment, the subset of terminals may be determined by randomly selecting a group of terminals located within a certain proximity of a target terminal (e.g., within a one mile radius of a new installation). Also, in an example embodiment, a peer group may be divided in multiple different areas, with each area having a corresponding subset of terminals (e.g., quadrants of a peer group).

Accordingly, the presently disclosed methods and systems may advantageously detect a problem before a customer notices any problem or decline in service, thus improving customer service relations. For example, a customer may never need to call a customer service line to request that a problem be diagnosed because, before any decline in internet speed or television reception quality occurs, the problem is detected and diagnosed by the peer group diagnosis detection method and system. Further, the presently disclosed methods and systems may validate good installations of satellite terminals using real-time data. The use of real-time data to validate installations of satellite terminals may provide a service technician with real-time confirmation that an installation is good or, alternatively, notify the technician in real-time that an installation is bad so it can be corrected before the technician leaves the installation site. Accordingly, real-time signal validation may greatly minimize repair visits due to improper installations. It should be appreciated that, for example, the rate of unnecessary repair visits may be reduced to less than 0.01% of all repair visits. Accordingly, a great reduction in costs and improvement in customer service may be achieved using the presently disclosed real-time signal validation method and system.

For exemplary purposes, the present disclosure discusses a various examples relating to a satellite communication system. However, it should be appreciated that the disclosed system, methods, and apparatus may be advantageously used in various different types of communication systems including, for example, systems that do not use satellites (e.g., a terrestrial point to point communication system).

It will be appreciated that all of the disclosed methods and procedures described herein can be implemented using one or more computer programs or components. These components may be provided as a series of computer instructions on any conventional computer readable medium, including RAM, ROM, flash memory, magnetic or optical disks, optical memory, or other storage media. The instructions may be configured to be executed by a processor, which when executing the series of computer instructions performs or facilitates the performance of all or part of the disclosed methods and procedures.

It should be understood that various changes and modifications to the example embodiments described herein will be apparent to those skilled in the art. Such changes and modifications can be made without departing from the spirit and scope of the present subject matter and without diminishing its intended advantages. It is therefore intended that such changes and modifications be covered by the appended claims. Also, it should be appreciated that the features of the dependent claims may be embodied in the systems, methods, and apparatus of each of the independent claims.

The invention claimed is:

1. A method comprising:
   determining a subset of terminals in a peer group of satellite terminals;
   measuring at least one operational statistic of the satellite terminals in the subset of terminals;
   comparing the at least one operational statistic of each of the satellite terminals in the subset of terminals to a prior measurement of the same at least one operational statistic for each of the satellite terminals in the subset of terminals;
   determining an offset between a current measurement of the at least one operational statistic and the prior measurement of the same at least one operational statistic for each of the satellite terminals in the subset of terminals;
   determining an average offset of the current measurement of the at least one operational statistic and the prior measurement of the same at least one operational statistic for the subset of terminals;
   merging the average offset for the subset of terminals with at least one previously determined peer group operational statistic; and
   performing a signal validation of a terminal using an updated deviation value.

2. The method of claim 1, wherein the subset of terminals includes a number of satellite terminals in a range of 10% to 25% of the peer group of satellite terminals.

3. The method of claim 1, wherein the subset of terminals is determined by randomly selecting a predetermined number of terminals from the peer group.

4. The method of claim 1, wherein the at least one operational statistic includes at least one of a reception power, a transmission power, a signal to noise ratio, an error rate, and a latency value.

5. The method of claim 1, wherein the at least one operational statistic includes at least an uplink signal to noise ratio and a downlink signal to noise ratio.

6. The method of claim 1, wherein measuring the at least one operational statistic of the satellite terminals in the subset of terminals occurs on a regular time interval.

7. The method of claim 1, wherein a plurality of samples are measured at each terminal in the subset of terminals, and the plurality of samples are averaged to determine the offset for each terminal in the subset of terminals.

8. The method of claim 1, wherein updated deviation values including at least one of average offset values, updated mean values, and updated threshold deviation values, are stored in a table to be referenced for terminal performance validation.

9. The method of claim 1, wherein each satellite terminal of the subset of terminals are located within a certain proximity of a target terminal.

10. The method of claim 1, wherein a plurality of subsets of terminals each provide an average offset for a plurality of different areas of the peer group.

11. A system comprising:
    a computer readable medium storing satellite profile information; and
    at least one processing device operably coupled to the computer readable medium, the at least one processing device executing instructions to:
       determine a subset of terminals in a peer group of satellite terminals;
       measure at least one operational statistic of the satellite terminals in the subset of terminals;
       compare the at least one operational statistic of each of the satellite terminals in the subset of terminals to a prior measurement of the same at least one operational statistic for each of the satellite terminals in the subset of terminals;
       determine an offset between a current measurement of the at least one operational statistic and the prior measurement of the same at least one operational statistic for each of the satellite terminals in the subset of terminals;
       determine an average offset of the current measurement of the at least one operational statistic and the prior measurement of the same at least one operational statistic for the subset of terminals;
       merge the average offset for the subset of terminals with at least one previously determined peer group operational statistic; and
       perform a signal validation of a terminal using an updated deviation value.

12. The system of claim 11, wherein the subset of terminals includes a number of satellite terminals in a range of 10% to 25% of the peer group of satellite terminals.

13. The system of claim 11, wherein the subset of terminals is determined by randomly selecting a predetermined number of terminals from the peer group.

14. The system of claim 11, wherein the at least one operational statistic includes at least one of a reception power, a transmission power, a signal to noise ratio, an error rate, and a latency value.

15. The system of claim 11, wherein the at least one operational statistic includes at least an uplink signal to noise ratio and a downlink signal to noise ratio.

16. The system of claim 11, wherein measuring the at least one operational statistic of the satellite terminals in the subset of terminals occurs on a regular time interval.

17. The system of claim 11, wherein a plurality of samples are measured at each terminal in the subset of terminals, and the plurality of samples are averaged to determine the offset for each terminal in the subset of terminals.

18. The system of claim 11, wherein updated deviation values including at least one of average offset values, updated mean values, and updated threshold deviation values, are stored in a table to be referenced for terminal performance validation.

19. The system of claim 11, wherein each satellite terminal of the subset of terminals are located within a certain proximity of a target terminal.

20. The system of claim 11, wherein a plurality of subsets of terminals each provide an average offset for a plurality of different areas of the peer groups.

* * * * *